United States Patent
Longman et al.

(10) Patent No.: US 9,385,391 B2
(45) Date of Patent: Jul. 5, 2016

(54) FUEL CELLS

(75) Inventors: Robert Longman, Cheshire (GB); Brian Clarkson, Cheshire (GB)

(73) Assignee: ACAL ENERGY, LTD., Runcorn, Cheshire (GB)

( * ) Notice: Subject to any disclaimer, the term of this patent is extended or adjusted under 35 U.S.C. 154(b) by 777 days.

(21) Appl. No.: 13/582,317

(22) PCT Filed: Mar. 1, 2011

(86) PCT No.: PCT/GB2011/050410
§ 371 (c)(1),
(2), (4) Date: Dec. 4, 2012

(87) PCT Pub. No.: WO2011/107794
PCT Pub. Date: Sep. 9, 2011

(65) Prior Publication Data
US 2013/0071702 A1  Mar. 21, 2013

(30) Foreign Application Priority Data

Mar. 2, 2010 (GB) .................................. 1003466.8
Sep. 23, 2010 (GB) .................................. 1016005.9

(51) Int. Cl.
*H01M 8/20* (2006.01)
*B01F 3/04* (2006.01)
(Continued)

(52) U.S. Cl.
CPC ............. *H01M 8/20* (2013.01); *B01F 3/04262* (2013.01); *B01F 3/04808* (2013.01); *H01M 2/40* (2013.01); *H01M 8/04186* (2013.01); *H01M 8/188* (2013.01); *B01F 2003/04312* (2013.01);
(Continued)

(58) Field of Classification Search
CPC .................................. H01M 8/18; H01M 8/20
See application file for complete search history.

(56) References Cited

U.S. PATENT DOCUMENTS 3,548,569 A * 12/1970 Jepsen et al. .................... 96/228
4,457,987 A *  7/1984 Horiba et al. .................. 429/502
(Continued)

FOREIGN PATENT DOCUMENTS

JP    2007-167856 A    7/2007
JP    2008-149052 A    3/2008
(Continued)

OTHER PUBLICATIONS

Search Report dated Jun. 10, 2010 from Great Britain Application No. GB1003466.8.
(Continued)

*Primary Examiner* — Jeremiah Smith
(74) *Attorney, Agent, or Firm* — Knobbe Martens Olson & Bear LLP

(57) ABSTRACT

A redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between respective anodes and cathodes of the cell; a catholyte solution comprising at least one catholyte component, the catholyte solution comprising a redox mediator couple; and a regeneration zone comprising a catholyte channel and a porous member having an active surface, the catholyte channel being arranged to direct a flow of catholyte adjacent to or towards the active surface, the means for supplying an oxidant to the cell being adapted to supply the oxidant to the porous member.

41 Claims, 12 Drawing Sheets

Figure 1:
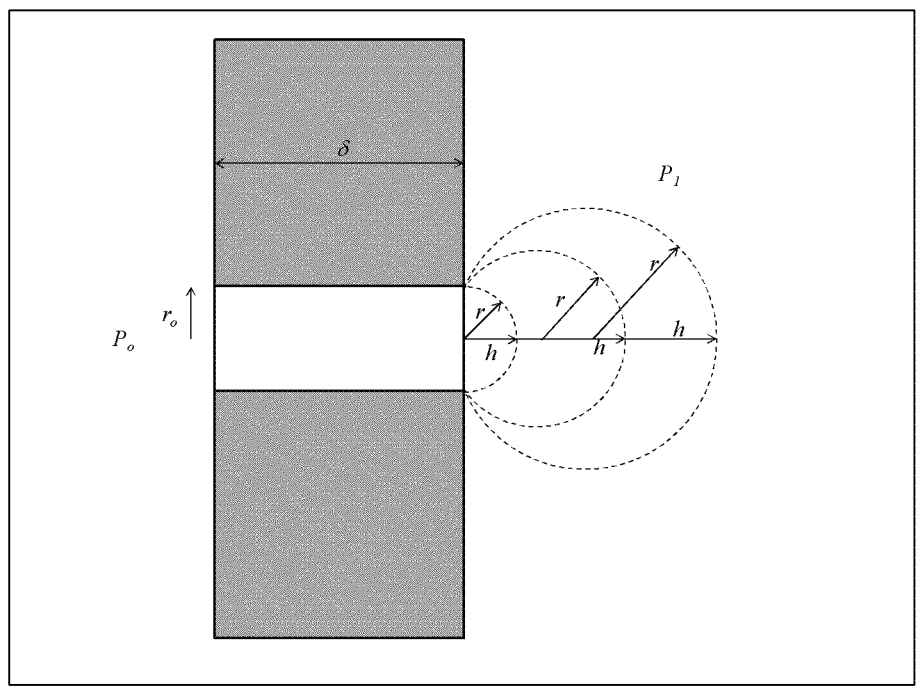

(51) Int. Cl.
*H01M 8/04* (2016.01)
*H01M 8/18* (2006.01)
*H01M 2/40* (2006.01)

(52) U.S. Cl.
CPC ............. *B01F2003/04361* (2013.01); *B01F 2215/0404* (2013.01); *B01F 2215/0422* (2013.01); *B01F 2215/0431* (2013.01); *Y02E 60/528* (2013.01); *Y02P 70/56* (2015.11); *Y10T 137/0318* (2015.04)

(56) References Cited

U.S. PATENT DOCUMENTS

2005/0146063 A1    7/2005    Giangrasso
2007/0035045 A1    2/2007    Henley
2010/0112391 A1*   5/2010    Salloum et al. ................ 429/14
2011/0091746 A1*   4/2011    Knuckey et al. ................ 429/7

FOREIGN PATENT DOCUMENTS

| | | |
|---|---|---|
| JP | 2010-158631 A | 7/2010 |
| WO | 2008128341 A1 | 10/2008 |
| WO | 2009/037513 A1 | 3/2009 |
| WO | WO 2009/093080 * 7/2009 .............. H01M 8/18 |

OTHER PUBLICATIONS

Search Report dated Feb. 8, 2011 from Great Britain Application No. GB1016005.9.

* cited by examiner

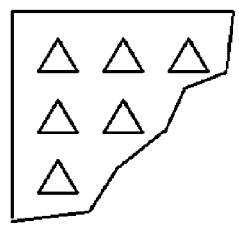
Figure 4a(i)
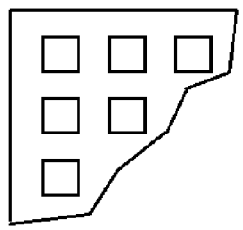
Figure 4a(ii)
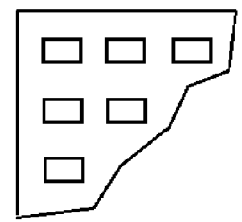
Figure 4a(iii)
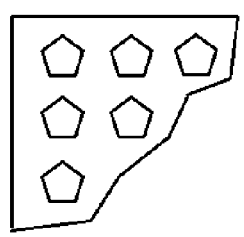
Figure 4a(iV)
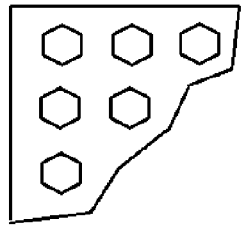
Figure 4a(v)
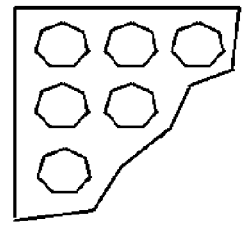
Figure 4a(vi)
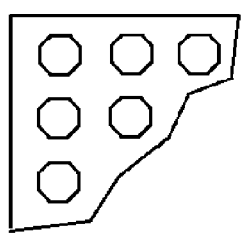
Figure 4a(vii)
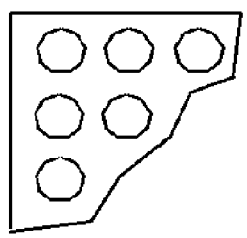
Figure 4a(viii)
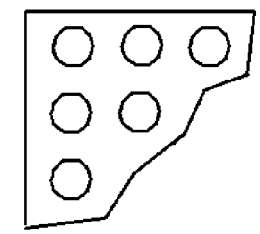
Figure 4a(ix)

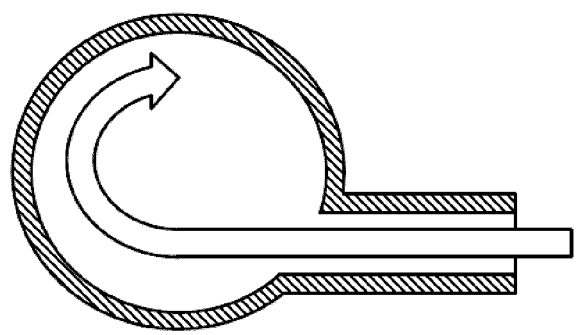
Figure 9a(i)
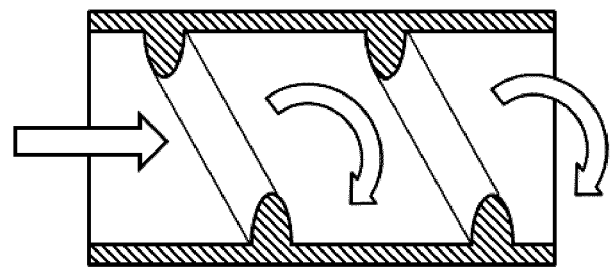
Figure 9a(ii)

FUEL CELLS

CROSS-REFERENCE TO RELATED APPLICATIONS

This application is the U.S. National Phase under 35. U.S.C. §371 of International Application PCT/GB2011/050410, filed Mar. 1, 2011, which claims priority to UK Patent Application No. 1003466.8, filed Mar. 2, 2010 and UK Patent Application No. 1016005.9, filed Sep. 23, 2010 The disclosures of the above-described applications are hereby incorporated by reference in their entirety. The International Application was published under PCT Article 21(2) in English.

The present invention relates to fuel cells, in particular to indirect or redox fuel cells which have applications in stationary, back-up and combined heat and power (chp) contexts, as well as in fuel cells for the automotive industry and in micro-fuel cells for electronic and portable electronic devices.

Fuel cells have been known for portable applications such as automotive and portable electronics technology for many years, although it is only in recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, and air or oxygen as oxidant and the product of the reaction is water. The gases are fed respectively into catalysing, diffusion-type electrodes separated by a solid or liquid electrolyte which carries electrically charged particles between the two electrodes. In an indirect or redox fuel cell, the oxidant (and/or fuel in some cases) is not reacted directly at the electrode but instead reacts with the reduced form (oxidized form for fuel) of a redox couple to oxidise it, and this oxidised species is fed to the cathode.

There are a number of constraints on this step of oxidising the redox couple. Oxidation of the redox couple should occur as rapidly as possible as a reduction in flow rate of the catholyte through the cathode will reduce the rate of energy production. The rate of energy production will also be reduced if oxidation of the redox couple is not as complete as possible, i.e. if a significant proportion of the redox couple remains unoxidised. The provision of apparatus which rapidly and completely oxidises redox couples present in catholyte solutions is made challenging by the need to ensure that the energy consumed when the oxidation step is taken is relatively low, otherwise the overall power generation performance of the fuel cell will be reduced. Additionally, the apparatus used to oxidise the redox couple should be as compact as possible, especially when the fuel cell is intended for use in portable or automotive applications.

The need to balance these conflicting requirements gives rise to inefficiencies in cell performance, particularly in automotive applications and in combined heat and power.

It is an object of the present invention to overcome or ameliorate one or more of the aforesaid disadvantages. It is a further object of the present invention to provide an improved redox fuel cell structure for efficient oxidation of redox couples.

According to a first aspect of the present invention, there is provided a redox fuel cell comprising:
 an anode and a cathode separated by an ion selective polymer electrolyte membrane;
 means for supplying a fuel to the anode region of the cell;
 means for supplying an oxidant to the cathode region of the cell;
 means for providing an electrical circuit between respective anodes and cathodes of the cell;
 a catholyte solution comprising at least one catholyte component, the catholyte solution comprising a redox mediator couple; and
 a regeneration zone comprising a catholyte channel and a porous member having an active surface, the catholyte channel being arranged to direct a flow of catholyte solution adjacent to or towards the active surface, the means for supplying an oxidant to the cell being adapted to supply the oxidant to the porous member.

By "cathode region" is meant that part of the cell bounded on one side by the cathode side of the membrane electrode assembly. Alternatively, or as well, the "cathode region" may be thought of as that part of the cell in which at least a part of the catholyte flowing therethrough in operation of the cell contacts the cathode side of the membrane electrode assembly.

Likewise, by "anode region" is meant that part of the cell bounded on one side by the anode side of the electrode assembly.

In operation of the cell the catholyte is provided flowing in fluid communication with the cathode through the cathode region of the cell. The redox mediator couple is at least partially reduced at the cathode in operation of the cell, and at least partially re-generated by reaction with the oxidant after such reduction at the cathode. The at least partial regeneration of the redox mediator couple is effected in the regeneration zone. Specifically, the interfacial area of oxidant passing through the active surface of the porous member and the catholyte flowing towards or adjacent to the porous member is large. Regeneration of the redox mediator couple begins at this point and continues as the catholyte, with the oxidant entrained therein, passes through the reoxidation zone.

In a preferred arrangement, at least a portion of the channel wall is open to expose the interior of the catholyte channel to at least a portion of the active surface of the porous member.

The porous member may be formed of any porous material that permits the throughflow of the oxidant in sufficient volumes to enable the at least partially reduced redox couple to be at least partially re-generated, i.e. oxidised. Examples of suitable materials include sintered glass or metal powders, porous or semi-permeable membranes, meshes and drilled or punctured sheets.

To enhance the performance of the porous member, it may be formed or modified specifically to maximise the surface area of the oxidant passing therethrough. For example, the location and size of the pores may be controlled to encourage the release of small gas bubbles. Further, the flow of catholyte towards or past the porous member will encourage the release of small bubbles before they have time to grow. The rapid removal of bubbles is advantageous as it allows fresh catholyte liquid to contact the active surface of the porous member.

Typically, average bubble size diameters are in the range of 1 to 1000 microns. Preferably, the formed bubble size is smaller, for example 150 microns in diameter or less, 1 to 100 microns, or most preferably, 25 to 50 microns in diameter. To achieve a flow of bubbles having average diameters falling within these preferred ranges, pores should be provided having a diameter which is smaller than the target bubble diameter by a factor of 3 to 10 times.

The rapid removal of bubbles can also be encouraged by rendering the surface of the porous member hydrophilic, either by coating it with a hydrophilic material, or by forming the active surface of the porous member from a hydrophilic material. The presence of a hydrophilic material on the active surface of the porous member will cause formed bubbles to be more easily released than from a hydrophobic surface. Preferably, such materials will have a surface energy of greater than 46 dynes/cm$^2$ and/or may include hydrophilic groups, such as hydroxyl groups. An example of such a material is acetate rayon. Additionally or alternatively, acceptable hydrophilic properties can be achieved by treating metal surfaces. Such treated metal surfaces include annealed austenitic stainless steel, laser or plasma coated stainless steel or oxide or nitride modified surface coatings.

It will be appreciated that the ingress of catholyte liquid into the porous member will be unfavourable as this will block the throughflow of oxidant, meaning that the rate of oxidation of that catholyte will be reduced. To overcome this problem, the porous member may be formed of a material which is hydrophobic, with a coating on the surface exposed to the catholyte channel which is hydrophilic. Examples of hydrophobic materials from which the porous member may be formed include polytetrafluoroethylene, halogenated organic polymers, silicone polymers and hydrocarbon polymers such as polythene and polypropylene. Additionally, or alternatively, the maximum pore size can be sufficiently small such that the surface tension of the catholyte prevents it from entering the porous member even when no oxidant is passed through the porous member.

The pores in the porous member, especially its active surface, may be formed using any technique known to those skilled in the art. In preferred embodiments, the pores are produced by laser machining.

The catholyte channel and porous member may be arranged in any way, provided that the redox couple in the catholyte solution is at least partially regenerated.

In one arrangement, the porous member may be an elongate member. In a preferred embodiment, the porous member is substantially cylindrical or tubular. One or more porous members may be employed in the fuel cell of the present invention.

Alternatively, the catholyte channel may be provided as a tube coiled around the porous member, as a channel co-axial with the porous member or as an annulus around the porous member. In such arrangements, the channel wall may be open along substantially all of its length or along parts of its length to expose the interior of the catholyte channel to parts of the active surface of the porous member. The oxidant is supplied to an interior of the porous member at a positive pressure, causing the oxidant to pass through the outer surface of the porous member and into the catholyte channel.

In an alternative arrangement, the catholyte channel may be formed within the porous member. The catholyte channel may be linear or may be helical. In these arrangements, the active surface of the porous member is provided on the interior surface of the porous member and oxidant is passed inwardly through the porous member, through the inner, active surface and into the catholyte channel.

In certain embodiments, most preferably those where the interior of the catholyte channel is exposed to the active surface of the porous member around the majority, if not the totality of its circumference, the regeneration zone may preferably comprise catholyte rotation means, to maximise the exposure of the catholyte to the active surface, thus maximising oxidation of the redox couple. The rotation means could comprise an offset liquid inlet, to cause helical flow of the catholyte through the channel. Additionally, or alternatively, the rotation means may comprise a diversion member to induce rotational flow through the channel by means of, for example, spiral-like protuberances.

In certain arrangements of the present invention, the catholyte channel preferably increases in cross section area in the direction of catholyte flow. This is to accommodate the increasing volume of catholyte and oxidant, thus preventing an acceleration in flow rate. The increase in cross section area could be achieved by the channel having a diverging taper.

In a further arrangement, the regeneration zone may comprise generally planar porous members which define one or more walls of a chamber. An open end of the catholyte channel is either provided to ensure that the stream of catholyte exiting the catholyte channel is directed toward and flows past at least a portion of the active surface of the porous member. This may be achieved by locating the open end of the catholyte channel substantially adjacent to the planar porous member or a slight distance away from, but pointed toward the porous member.

An advantage of planar regeneration zones is that they may be added as extensions of the individual fuel cells such that there are an equal number of cells and regeneration units. This should allow a single assembly to accomplish both power generation and regeneration functions, reducing the cost of the system.

Such arrangements are distinguishable from bubble column reactors, where inlet ports are neither provided substantially adjacent to nor are pointed towards the bubble forming bases conventionally used in such reactors. Instead, inlet ports in such reactors will be provided a distance from the bubble forming bases so as not to interfere with the formation of bubbles. Further, the inlet ports will not direct liquid toward the bubble forming bases for the same reasons.

The distinction between bubble column reactors and the regeneration zones employed in the present invention is made as the inventors found that the performance of such reactors was unfavourable when compared to the performance of the regeneration zones employed in the fuel cells of the present invention. More specifically, when a bubble column reactor was utilised to entrain particles of oxidant gas into a catholyte, the hold up ratio (by volume) of gas:catholyte in the system was found to be significantly less than 1:1, i.e. the oxidation of the redox couple in the catholyte was incomplete.

Regardless of the specific arrangement employed, a significant quantity of oxidant is exposed to the catholyte in the regenerator of the fuel cell of the present invention. In preferred embodiments of the present invention, every volume of catholyte which passes through the regeneration zone is exposed to the same volume of oxidant. In especially preferred embodiments, every volume of catholyte which passes through the regeneration zone is exposed to two times, three times, or even four times that volume of oxidant.

When the catholyte liquid is exposed to such high volumes of gaseous oxidant, a foam will usually be formed.

To maximise the oxidation of the redox couple in this foam, an expansion region may be provided in the regeneration zone. The expansion region is preferably a chamber into which the foamed catholyte is flowed, resulting in a decrease in flow rate. This reduction in flow velocity results in an increase in residence time and hence mass transfer and, accordingly, an increase in the rate of oxidation of the redox couple. The optimal shape and size of the expansion chamber will vary depending on the fluid properties of the liquid and the available reaction rates.

In those arrangements where the oxidant is provided as a gas, the foamed mixture is preferably flowed from the expansion region into a separation region, which preferably takes the form of a chamber. Like the expansion region, the flow rate in the separation region is preferably low. The residual oxidant gas is separated from the now regenerated catholyte by the natural collapse of the bubbles in the foam. To increase the rate of collapse, cavitation means may be provided. The cavitation means may comprise a cyclone separator which effects the rapid separation of the gas and liquid phases.

The flow rate of the catholyte through the regeneration zone is preferably relatively high. In a preferred embodiment, the flow rate of the catholyte, as it contacts or passes adjacent to the active surface of the porous member is at least about 0.2 m/s. In an especially preferred embodiment, the flow rate of the catholyte as it contacts or passes adjacent to the active surface of the porous member is about 0.5 to about 1.5 m/s.

In a preferred embodiment of the present invention, the regeneration zone is separate from the membrane assembly. Thus, the fuel cell of the invention preferably comprises means for supplying at least partially reduced redox mediator couple from the cathode region of the cell to the regeneration zone.

Further, the fuel cell of the invention preferably comprises means for supplying at least partially regenerated redox mediator couple from the regeneration zone to the cathode region.

The catholyte solution comprising the redox mediator couple therefore circulates in operation of the cell from the regeneration zone in at least partially regenerated (oxidised) form to the cathode region where it is at least partially reduced and thereafter returns to the regeneration zone where it reacts (directly or indirectly, when a redox catalyst is present) with the oxidant before returning to the cycle.

At any convenient location in the cycle one or more pumps may be provided to drive circulation of the catholyte solution. Preferably, at least one pump is situated between the downstream end of the regeneration zone and the upstream end of the cathode region.

The cathode region preferably comprises one or more of: an inlet port for receiving at least partially regenerated redox mediator couple from the regeneration zone; and an outlet port for supplying at least partially reduced redox mediator couple to the regeneration zone.

The regeneration zone preferably comprises one or more of: a chamber in which the regeneration reaction takes place; a first inlet port for receiving into the chamber reduced redox mediator couple from the cathode region of the cell; a first outlet port for supplying oxidised redox mediator couple to the cathode region of the cell; a second inlet port for receiving a supply of oxidant; and a second outlet port for venting gas, water vapour and/or heat from the chamber.

To reduce, and possibly eliminate, any loss in catholyte solution, one or more demisters may be provided in or upstream of the second outlet port.

Additionally, to prevent excessive evaporation of water from the catholyte, condensers may be provided in or upstream of the second outlet port. If a condenser is employed in the fuel cell of the present invention, it is preferably arranged such that a predetermined amount of condensate will be returned to the system. Prior to being passed back into the catholyte, the condensate is preferably passed through the demister/s.

The fuel cell of the invention, when used in a chp application, may be provided with heat transfer means associated with the regeneration zone for transferring heat generated in the regeneration zone to an external target such as a domestic or commercial boiler for example. Heat transfer means may work under standard principles of heat exchange, e.g. with close-contacting pipework, fins and vanes for increasing surface area contact between a cold pipe and a warm pipe, for example.

While reference is made above to the 'anode' and 'cathode' (in the singular) it will be appreciated that the fuel cell of the invention will typically comprise more than one membrane electrode assembly, each assembly separated by bipolar separation plates, in what is commonly known in the art as a fuel cell stack. It is contemplated within the scope of the invention to provide plural to regeneration zones, with each regeneration zone receiving reduced redox mediator couple from a or some parts of the stack, and returning oxidised redox mediator couple to the same or different part or parts of the stack. However, commonly a single regeneration zone will serve the whole stack, or part of it.

The operation in redox terms of the fuel cell of the invention may be characterised as between the cathode region (stack) and the regeneration zone (regenerator) in accordance with the following scheme, in which the presence and function of the redox catalyst should be understood to be optional:

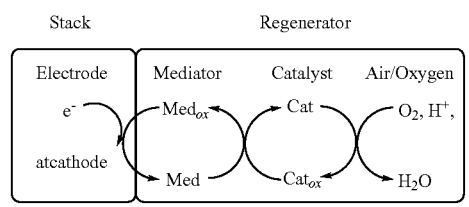

The redox mediator couple and/or the redox catalyst when present may comprise a polyoxometallate compound, as described in our co-pending PCT/GB2007/050151.

The redox mediator couple and/or the redox catalyst when present may comprise a polyoxometallate compound with a divalent counterion, as described in our co-pending PCT/GB2008/050857.

The redox mediator couple and/or the redox catalyst when present may comprise an N-donor compound, as described in our co-pending PCT/GB2007/050421.

The redox mediator couple and/or the redox catalyst when present may comprise a multi-dentate N-donor ligand comprising at least one heterocyclic substituent selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid heterocyclic groups, as described in our co-pending PCT/GB2009/050065.

The redox mediator couple and/or the redox catalyst when present may comprise a multidentate macrocyclic N-donor ligand, as described in our co-pending PCT/GB2009/050067.

The redox mediator couple and/or redox catalyst when present may comprise a modified ferrocene species as described in our co-pending PCT/GB2007/050420.

The redox mediator couple and/or redox catalyst when present may comprise a modified ferrocene species comprising a bridging unit between the cyclopentadienyl rings as described in our co-pending PCT/GB2009/050066.

Generally, the redox mediator couple will comprise ligated transition metal complexes. Specific examples of suitable transition metals ions which can form such complexes include manganese in oxidation states II-V, Iron I-IV, copper I-III, cobalt I-III, nickel I-III, chromium (II-VII), titanium II-IV, tungsten IV-VI, vanadium II-V and molybdenum II-VI. Ligands can contain carbon, hydrogen, oxygen, nitrogen, sulphur, halides, and phosphorus. Ligands may be chelating complexes include Fe/EDTA and Mn/EDTA, NTA, 2-hydroxyethylenediaminetriacetic acid, or non-chelating such as cyanide.

The fuel cell of the invention may operate straightforwardly with a redox couple catalysing in operation of the fuel cell the reduction of oxidant in the cathode region. However, in some cases, and with some redox couples, it may be necessary and/or desirable to incorporate a catalytic mediator in the catholyte solution.

In one preferred embodiment of the invention, the ion selective PEM is a cation selective membrane which is selective in favour of protons versus other cations.

The cation selective polymer electrolyte membrane may be formed from any suitable material, but preferably comprises a polymeric substrate having cation exchange capability. Suitable examples include fluororesin-type ion exchange resins and non-fluororesin-type ion exchange resins. Fluororesin-type ion exchange resins include perfluorocarboxylic acid resins, perfluorosulfonic acid resins, and the like. Perfluorocarboxylic acid resins are preferred, for example "Nafion" (Du Pont Inc.), "Flemion" (Asahi Gas Ltd), "Aciplex" (Asahi Kasei Inc.), and the like. Non-fluororesin-type ion exchange resins include polyvinyl alcohols, polyalkylene oxides, styrene-divinylbenzene ion exchange resins, and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, polytriflurostyrene sulphonic, sulphonated trifluorostyrene, sulphonated copolymers based on $\alpha,\beta,\beta$ triflurostyrene monomer, radiation-grafted membranes. Non-fluorinated membranes include sulphonated poly(phenylquinoxalines), poly (2,6 diphenyl-4-phenylene oxide), poly(arylether sulphone), poly(2,6-diphenylenol); acid-doped polybenzimidazole, sulphonated polyimides; styrene/ethylene-butadiene/styrene triblock copolymers; partially sulphonated polyarylene ether sulphone; partially sulphonated polyether ether ketone (PEEK); and polybenzyl suphonic acid siloxane (PBSS).

In some cases it may be desirable for the ion selective polymer electrolyte membrane to comprise a bi-membrane as described in our copending PCT/EP2006/060640.

According to a further aspect of the present invention, there is provided a process for operating a redox fuel cell comprising:

providing an anode and a cathode separated by an ion selective polymer electrolyte membrane;
providing a catholyte solution comprising at least one catholyte component, the catholyte solution comprising a redox mediator couple; and
providing a regeneration zone comprising a catholyte channel and a porous member having an active surface, directing a flow of catholyte solution adjacent to or towards the active surface by means of the catholyte channel
supplying an oxidant to the porous member of the regeneration zone;
supplying a fuel to the anode region of the cell;
providing an electrical circuit between respective anodes and cathodes of the cell.

It will be appreciated that the process of the invention may be used to operate the fuel cell of the invention in all its various embodiments, preferences and alternatives, and that when this specification describes any feature of such a fuel cell it also specifically envisages that that feature may also be a preference or alternative process feature in the process of the invention.

The fuel cell of the invention may comprise a reformer configured to convert available fuel precursor such as LPG, LNG, gasoline or low molecular weight alcohols into a fuel gas (e.g. hydrogen) through a steam reforming reaction. The cell may then comprise a fuel gas supply device configured to supply the reformed fuel gas to the anode region.

It may be desirable in certain applications of the cell to provide a fuel humidifier configured to humidify the fuel, e.g. hydrogen. The cell may then comprise a fuel supply device configured to supply the humidified fuel to the anode region.

An electricity loading device configured to load an electric power may also be provided in association with the fuel cell of the invention.

Preferred fuels include hydrogen; metal hydrides (for example borohydride which may act as a fuel itself or as a provider of hydrogen), ammonia, low molecular weight alcohols, aldehydes and carboxylic acids, sugars and biofuels as well as LPGLNG or gasoline.

Preferred Oxidants Include Air, Oxygen and Peroxides

The anode in the redox fuel cell of the invention may for example be a hydrogen gas anode or a direct methanol anode; other low molecular weight alcohols such as ethanol, propanol, dipropylene glycol; ethylene glycol; also aldehydes formed from these and acid species such as formic acid, ethanoic acid etc. In addition the anode may be formed from a bio-fuel cell type system where a bacterial species consumes a fuel and either produces a mediator which is oxidized at the electrode, or the bacteria themselves are adsorbed at the electrode and directly donate electrons to the anode.

The cathode in the redox fuel cell of the invention may comprise as cathodic material carbon, gold, platinum, nickel, metal oxide species. However, it is preferable that expensive cathodic materials are avoided, and therefore preferred cathodic materials include carbon, nickel and metal oxide. One preferable material for the cathodes is reticulated vitreous carbon or carbon fibre based electrodes such as carbon felt. Another is nickel foam. The cathodic material may be constructed from a fine dispersion of particulate cathodic material, the particulate dispersion being held together by a suitable adhesive, or by a proton conducting polymeric material. The cathode is designed to create maximum flow of catholyte solution to the cathode surface. Thus it may consist of shaped flow regulators or a three dimensional electrode; the liquid flow may be managed in a flow-by arrangement where there is a liquid channel adjacent to the electrode, or in the case of the three dimensional electrode, where the liquid is forced to flow through the electrode. It is intended that the surface of the electrode is also the electrocatalyst, but it may be beneficial to adhere the electrocatalyst in the form of deposited particles on the surface of the electrode.

The redox couple, and any other ancillary redox couple or catalyst, utilised in the fuel cell of the invention should be non-volatile, and is preferably soluble in aqueous solvent. Preferred redox couples should react with the oxidant at a rate effective to generate a useful current in the electrical circuit of the fuel cell, and react with the oxidant such that water is the ultimate end product of the reaction.

Also provided in accordance with the present invention is a catholyte regeneration system comprising: a chamber; a first inlet port for receiving into the chamber reduced redox mediator couple from the cathode region of the cell; a first outlet port for supplying oxidised redox mediator couple to the cathode region of the cell; a second inlet port for receiving a supply of oxidant; and a second outlet port for venting gas, water vapour and/or heat from the chamber, a catholyte channel in fluid communication with the first inlet port, a porous member having an active surface, at least a portion of the interior of the catholyte channel being exposed to at least a portion of the active surface of the porous member, wherein:

a) the porous member comprises pores having an average diameter of 5 to 100 microns, or more preferably, 20 to 50 microns;

b) at least a portion of the active surface is formed of or coated with hydrophilic material; and/or c) at least a portion of the porous member, excluding the active surface, is formed of a hydrophobic material.

For the avoidance of any doubt, any of the features of the regeneration zone of the fuel cell of the present invention which are provided above may be employed in the catholyte regeneration system of the present invention.

Also provided in accordance with the invention is the use of a fuel cell as described herein to provide motive power to a vehicle.

Also provided in accordance with the invention is the use of a fuel cell as described herein to generate power in an electronic component.

The invention also provides a combined heat and power system comprising at least one fuel cell as described herein.

The invention also provides a vehicle comprising at least one fuel cell as described herein.

The invention also provides an electronic component comprising at least one fuel cell as described herein.

One of the main purposes of the porous member is to generate fine bubbles when the oxidant is supplied thereto. The porous member may then be utilised in the fuel cell in an efficient manner. The porous member is intended to permit the throughflow of oxidant in sufficient volumes to enable the at least partially reduced redox couple to be at least partially re-generated. Of course, there are other means of forming gas bubbles.

Some of the common techniques used to form gas bubbles include: compressed air to dissolve air into a liquid stream, which is then released through nozzles to form bubbles by cavitation; air streams delivered under a liquid surface, where bubbles are broken off mechanically, say by agitation or shear forces; and ultrasonic induced cavitation.

In a system to generate air bubbles by introducing air into water flow with a shearing force using vanes and an air bubble jet stream, it is often required to employ a higher number of revolutions to generate cavitation. However, problems arise such as power consumption increase and corrosion of vanes or vibration caused by the generation of cavitation. Further, such a technique does not lend itself to generating large amounts of fine bubbles.

The desire for small bubbles is that they provide a variety of excellent effects, which have been utilized in many industrial fields including plant cultivation, aquafarming, wastewater treatment and the like. It is effective to reduce the diameter of bubbles to increase their surface area relative to their volumes, thereby enlarging the contact area between the bubbles and the surrounding liquid; thus, a more rapid mass transfer process can take place when the bubble size is reduced.

However, in an aeration system using a conventional-type fine bubble generating system, for instance a diffusion system based on injection, even when fine pores are provided, when air bubbles are injected under pressure through pores, the volume of each bubble is expanded and the diameter of each bubble is increased to several millimeters due to the surface tension of the air bubbles during injection. Such a method encounters difficulty in generating fine bubbles of small diameter. Another problem associated with such a method is the clogging of the pores, which reduces the efficiency of the system.

It is thus desirable to generate fine bubbles in a more convenient and efficient is manner than known hitherto.

The general perception is that in order to reduce the size of a bubble, the solitary requirement is for the pore size through which the bubble is formed be reduced. However, there are a number of reasons why this perception is ill-conceived.

The first of these reasons is that the bubble is "anchored" to the substrate material through which it is formed, and will continue to inflate until the bubble breaks free by some disruptive force. The forces can, for instance, be buoyancy, inertial or shear forces applied to the bubble as it develops. The interfacial tension controls the force with which the bubble is held by virtue of it being anchored to the surface. In this way, there are three interactions that need be considered:

the interaction between the liquid and solid substrate, $\gamma_{ls}$, [mN/m];

the interaction between the liquid and gas (i.e air), $\gamma_{lg}$, [mN/m]; and the interaction between the solid substrate and gas (i.e air), $\gamma_{sg}$, [mN/m].

The relative contribution of these forces controls the nature of bubble growth and the ease with which the bubble is able to break away from the surface.

In addition to the above, the rate of bubble growth, $$\frac{dr}{dt},$$

is independent of the hole size, but can be expressed as:

$$\frac{dr_b}{dt} = \frac{F}{4\pi r_b^2} \qquad \text{Formula (1)}$$

Where F is the flow rate of gas going through the hole, and $r_b$ is the radius of the bubble. This implies that the smaller the bubble, the faster the rate of growth, and this can clearly be seen from FIG. 1 which shows the rapid growth of a bubble through a single hole of 30 microns diameter. It has been observed that bubbles form more or less instantaneously at the surface of a pierced or sintered material. As a gas bubble emerges from a hole into a liquid, the shape of the bubble is assumed to be a spherical cap of radius (r), and height (h), as seen in FIG. 1. The volume of the bubble is thus given by:

$$V = \frac{\pi}{3}h^2(3r - h) \qquad \text{Formula (2)}$$

There exists a geometrical relationship between bisecting cords that allows Formula (2) to be transformed to a single variable, h, such that:

$$V = \pi\left(\frac{r_o h^2}{2} - \frac{h^3}{6}\right) \qquad \text{Formula (3)}$$

The rate of volumetric growth of a bubble, dV/dt, is equal to the flow rate of gas, F, through the hole, given a constant differential pressure, $\Delta\Delta P = P_0 - P_1$. The differential identity:

$$\frac{dV}{dt} = \frac{dh}{dt} \cdot \frac{dV}{dh}$$ Formula (4)

Formula (4) can be used to give the linear rate of growth of the bubble:

$$\frac{dh}{dt} = \frac{2F}{\pi(r_o^2 + h^2)}$$ Formula (5)

Figure 2:
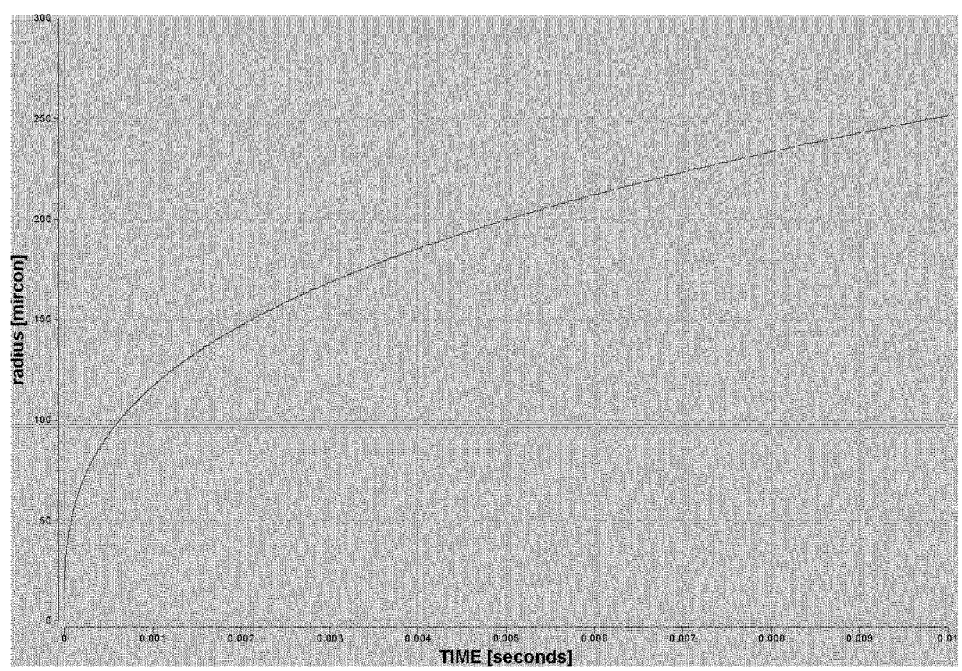

A numerical solution of Formula (5) gives the rate of growth of the bubble radius, as seen in see FIG. 2. The analysis shown in FIG. 2 is consistent with the observation that bubbles form more or less instantaneously at the surface of a pierced or sintered material. The extremely rapid growth of the bubble radius from the initial condition of $r_0=15$ μm to a radius of 250 μm (0.5 mm diameter) in 0.01 seconds can be seen. This is followed by a relatively steady growth rate. The solution of Formula (5) is thus also consistent with the observations.

It is known, from the Young-Laplace equation, that the maximum pressure, ΔP, within the bubble is achieved when the bubble is at its smallest radius, $r_b$:

$$\Delta P = P_{inside\ bubble} - P_{outside\ bubble} = \frac{2\gamma}{r_b}$$ Formula (6)

Where γ is the liquid/gas interfacial tension.

The minimum radius of the bubble occurs when the bubble is a hemisphere of the same radius of the hole through which it passes, which therefore constitutes the point of maximum pressure in the bubble; this is known as the break-through pressure.

It is desirable to provide means and a method for removing bubbles from the surface of the substrate and into the liquid before the bubble grows too large. It may be desirable, for instance, to generate fine bubbles having diameters of 100 microns or less, and preferably 50 microns or less.

The inventors postulated that if the flow of air, F, could be stopped on reaching the break-through pressure of the bubble, then the residual pressure in the hole would inflate the bubble to a small size, which subsequently could be cleaved from the surface, before flow was resumed.

A reservoir of air would be formed in the pore that feeds the bubble, which is of depth δ, and radius $r_o$. From Boyle's law, the initial state and bubble break-through, subscript "0", can be related to the final state, subscript "1":

$$p_0 V_0 = p_1 V_1$$ Formula (7)

The volumes at the initial and final states are given by:

$$V_o = 2\pi r_o^2 \delta + \frac{2}{3}\pi r_0^3$$ Formula (8)

$$V_1 = 2\pi r_o^2 \delta + \frac{4}{3}\pi r_1^3$$

The potential bubble size can be determined by combining Formulas (6), (7) and (8), and simplifying gives the relationship in the form of depressed cubic expression:

$$2r_1^3 - (3\delta r_o + r_o^2)r_1 + 3\delta r_o^2 = 0$$ Formula (9)

Where δ is the length/depth of the hole (i.e thickness of substrate), $r_o$ is the radius of the hole through which the bubble is formed, and $r_b$ is the final bubble size.

The solutions to Formula (9) are clearly dependent on the values of $r_0$ and δ. For typical values of $r_0=15$ μm and δ=70 μm, the solution to Formula (9) gives, $r_0=30$ μm, a bubble twice the size of the hole, but within the desired range. Table 1 gives a range of solutions for which a bubble will form when equilibrium is reached. These final values are all of a size which would provide good mass transfer if formed in large quantities.

TABLE 1

| Hole radius [μm] | Plate thickness | | | | |
|---|---|---|---|---|---|
| | 80 [μm] | 70 [μm] | 60 [μm] | 50 [μm] | 40 [μm] |
| 5 | 22 | 20 | 19 | 16 | 14 |
| 10 | 29 | 27 | 24 | 21 | |
| 15 | 33 | 30 | 26 | | |
| 20 | 35 | 30 | | | |
| 23 | 35 | | | | |

The inventors considered means for stopping the gas flow at the point of break-through of the bubble. As there are tens of thousands of holes in a typical porous element, individually stopping flow in each hole would seem prohibitively complex.

A number of alternative routes were considered which included:
  oscillatory or pulsed gas flow;
  using a sonic frequency actuator, such as a speaker, to cause pressure peaks and troughs;
  a flexible membrane that would open and close the rear of the holes as gas flowed; and
  use of orifice plates to restrict flow during the expansion phase of growth.

The porous member and/or device may comprise a substrate having holes therethrough, each hole comprising a gas inlet and a gas outlet, wherein the width of the gas outlet is greater than the width of the gas inlet.

It was found that use of an orifice having an outlet size greater than the inlet size for the purpose of restricting flow would deliver the sought-after properties. As the bubble expands beyond the break-through pressure, air supply would be limited by the restriction of the orifice, and so the flow term, F, in Formula (1) is reduced and consequently the rate of growth of the bubble is decelerated. In this way, there is provided a way in which to minimise the bubble size while retaining the capability of generating large amounts of fine bubbles. The complexity of the device is far less than that of known devices, such as those that employ cativation as the predominant technique for generating fine bubbles.

With regard to the device, the cross-sectional shape of each hole may be one selected from circular, triangular, square, rectangular, pentagonal, hexagonal, heptagonal, octagonal, nonagonal and decagonal. Of course, it will be appreciated that other geometric shapes may be equally as effective in achieving the function of the present invention. A circular cross-section may in some embodiments be particularly effective in generating fine bubbles.

The device may be a porous member or may be regarded as such. The porous member may be utilised in applications such as redox fuel cells, particularly regeneration systems for such cells.

The width of the gas outlet may be an order of magnitude greater than the width of the gas inlet. Typically, the outlet diameter may be less that half the diameter of the desired bubble diameter. The inlet diameter should be small enough to choke the gas flow. This effect is particularly seen when the inlet diameter is $1/10^{th}(0.1)$ to $1/5^{th}(0.2)$ of the outlet hole diameter. Gas Inlet widths in the range of 2 microns to 10 microns and gas outlet widths in the range from 20 microns to 50 microns in diameter are particularly effective. Consistency on geometry across the perforated surface may be critical to the effective performance of the devices; thus, a variation of no more than 10% is preferred; more particularly a variation of less that 1% may be desirable.

The hole may taper regularly from the gas inlet towards the gas outlet. Depending on the liquid-solid interfacial tension, the shape of the hole may prevent ingress of liquid into the holes. For example, a hydrophobic substrate with an open conical structure may desirably prevent liquid ingress.

The hole may taper irregularly from the gas inlet towards the gas outlet.

The hole density on the substrate may range from 400 to 10000 holes/cm$^2$. The hole density is a balance between pressure drop and coalescence of the bubbles. The higher frequency of bubble generation, the more likely they are to coalesce when the hole packing density is high. Hole density of 1,000 to 2,500 holes/cm$^2$ may be particularly favourable when using a square pitch. Stagger pitches have also been used to maximise bubble separation. Hexagonal and other pitches have been effective. Of course, it will be appreciated that other geometric pitches may be equally as effective in achieving the function of the present invention.

The thickness of the substrate may range from 20 to 1,000 microns; the thickness will impact the final bubble diameter as the reservoir of air increases. The preferred range may be 50 to 100 microns. Of course, it will be understood that other thicknesses of the substrate may be more suitable in different applications of the invention.

The gas outlet width may be about half the width of the desired bubble size, wherein the desired bubble size may range from 50 to 100 microns.

The substrate may have an active surface towards the gas outlets of the holes. The active surface is the surface in contact with the liquid phase in which the bubbles are to be dispersed. Having an active surface that attracts the liquid phase, for example a hydrophilic surface in the case as an aqueous liquid, is advantageous in producing small bubbles as the liquid favourably flows under the forming bubble and lifts the bubble from the surface, thereby enhancing fine bubble generation.

The wetting of the surface at which the bubbles form can be significant. To this end, at least a portion of the active surface may be formed of or coated with a hydrophilic material. A hydrophilic surface allows the liquid to "get under" the bubble as it grows, so as to lift it off and thus generate smaller bubbles.

It may be that at least a portion of the surface towards the gas inlet of the holes is formed of or coated with a hydrophobic material. Additionally, or alternatively, at least a portion of the interior of the holes may be coated with a hydrophobic material. A hydrophobic material does not wet and so the ingress of liquid into the holes or across to the gas side when the device is not active, under gas pressure, is prevented and allows rapid start-up with minimal break-through pressure requirements.

The substrate may be an elongate member. An elongate member may be particularly suitable for applications such as regeneration of catholyte solutions in redox fuel cells.

The gas outlet may comprise a lip projecting away from the active surface. The lip may act to lift the exiting-bubble higher in the laminar boundary layer of liquid flow, and to increase shear stresses to detach the bubble from the solid substrate. Of course, the substrate may be flexible which may improve its bubble-detachment capabilities.

The device may comprise one or more of sintered glass or metal powders, plastics, porous membranes, meshes and drilled or punctured sheets.

In some embodiments, it may be preferred that the device comprises stainless steel foils and/or polyimide films. These materials may be readily formed as thin sheets/substrates, which ability/property lends itself to the intended function of the invention.

In some embodiments, it may be that the angle of taper from the gas inlet towards the gas outlet is relative to the longitudinal axis of each hole and ranges from about 6° to 26°, and preferably from about 10° to 15°. Such angles, combined with the orifice diameter, provide superior control over the bubble size formation by limiting the reservoir of gas available for bubble formation.

It may be particularly advantageous that each hole is a frusto-conical shape.

There is disclosed a method of manufacturing a device for generating fine bubbles, comprising the steps of:
  providing a substrate; and
  perforating the substrate at predetermined locations with holes of predetermined widths.

Selecting the locations of the holes in the substrate may be significant to prevent coalescence of the bubble at the substrate surface. A well designed pattern of distribution will allow bubbles to form and be released into the liquid without other bubbles impacting during the formation process. A random distribution of holes may not necessarily allow this level of engineered control.

The step of perforating the substrate may involve using a laser. A laser provides an accurate way in which to perforate the substrate in term of location and size of the holes. This may be by way of forming a master template using laser machining and then mass producing sparge elements by electroplating or electro deposition.

There is also disclosed a method of generating fine bubbles, comprising the steps of:
  providing a device/porous member according to any of Claims (as defined herein);
  supplying the holes with a liquid; and
  feeding a gas through the holes via the gas inlet of each hole.

In some embodiments, it may be preferred that the liquid is supplied across the holes to induce flow of the liquid. This may significantly reduce the resultant bubble size. The viscous drag on the forming bubble provided by liquid flow is a significantly larger force them buoyancy between the gas and the liquid. The viscous drag overcomes the adhesion form interfacial tension more rapidly and so smaller bubbles are formed.

While the device for generating bubbles described hereinbefore has various applications, a particularly effective application is use of the device in a catholyte regeneration system for a redox fuel cell, for example.

In an indirect or redox fuel cell, the oxidant (and/or fuel in some cases) is not reacted directly at the electrode but instead reacts with the reduced form (oxidized form for fuel) of a redox couple to oxidise it, and this oxidised species is fed to the cathode.

There are a number of constraints on this step of oxidising the redox couple. Oxidation of the redox couple should occur as rapidly as possible as a reduction in flow rate of the catholyte through the cathode will reduce the rate of energy production. The rate of energy production will also be reduced if oxidation of the redox couple is not as complete as possible, i.e. if a significant proportion of the redox couple remains unoxidised. The provision of apparatus which rapidly and completely oxidises redox couples present in catholyte solutions is made challenging by the need to ensure that the energy consumed when the oxidation step is taken is relatively low, otherwise the overall power generation performance of the fuel cell will be reduced. Additionally, the apparatus used to oxidise the redox couple should be as compact as possible, especially when the fuel cell is intended for use in portable or automotive applications.

The need to balance these conflicting requirements gives rise to inefficiencies in cell performance, particularly in automotive applications and in combined heat and power.

The device for generating fine bubbles may be taken to be a porous member.

In operation of a redox fuel cell, the catholyte may be provided flowing in fluid communication with the cathode through the cathode region of the cell. The redox mediator couple is at least partially reduced at the cathode in operation of the cell, and at least partially re-generated by reaction with the oxidant after such reduction at the cathode. The at least partial regeneration of the redox mediator couple is effected in the regeneration zone. Specifically, the interfacial area of oxidant passing through the active surface of the porous member and the catholyte flowing towards or adjacent to the porous member is large. Regeneration of the redox mediator couple begins at this point and continues as the catholyte, with oxidant entrained therein, passes through the reoxidation zone.

In a preferred arrangement, at least a portion of the channel wall may be open to expose the interior of the catholyte channel to at least a portion of the active surface of the porous member.

The porous member may be formed of any porous material that permits the throughflow of the oxidant in sufficient volumes to enable the at least partially reduced redox couple to be at least partially re-generated, i.e. oxidised.

There is also disclosed a catholyte regeneration system for a redox fuel cell, comprising: a chamber; a first inlet port for receiving into the chamber reduced redox mediator couple from the cathode region of the cell; a first outlet port for supplying oxidised redox mediator couple to the cathode region of the cell; a second inlet port for receiving a supply of oxidant; and a second outlet port for venting gas, water vapour and/or heat from the chamber, a catholyte channel in fluid communication with the first inlet port, a device as defined herein having an active surface, and the catholyte channel being arranged to direct a flow of catholyte adjacent to or towards the active surface.

The device may comprise holes having an average diameter of 5 to 100 microns, preferably 20 to 50 microns.

By "cathode region" is meant that part of the cell bounded on one side by the cathode side of the membrane electrode assembly. Alternatively, or as well, the "cathode region" may be thought of as that part of the cell in which at least a part of the catholyte flowing therethrough in operation of the cell contacts the cathode side of the membrane electrode assembly.

Likewise, by "anode region" is meant that part of the cell bounded on one side by the anode side of the membrane electrode assembly.

To enhance the performance of the fine-bubble generating device (porous member), it may be formed or modified specifically to maximise the surface area of the oxidant passing therethrough. For example, the location and size of the pores (holes) may be controlled to encourage the release of small/fine gas bubbles. Further, the flow of catholyte/liquid towards or past the porous member will encourage the release of small bubbles before they have time to grow. The rapid removal of bubbles is advantageous as it allows fresh catholyte liquid to contact the active surface of the porous member.

Typically, average bubble size diameters are in the range of 1 to 1000 microns. Preferably, the formed bubble size is smaller, for example 150 microns in diameter or less, 1 to 100 microns, or most preferably, 25 to 50 microns in diameter. To achieve a flow of bubbles having average diameters falling within these preferred ranges, pores should be provided having a diameter which is smaller than the target bubble diameter by a factor of 3 to 10 times.

The rapid removal of bubbles can also be encouraged by rendering the surface of the porous member hydrophilic, either by coating it with a hydrophilic material, or by forming the active surface of the porous member from a hydrophilic material. The presence of a hydrophilic material on the active surface of the porous member will cause formed bubbles to be more easily released than from a hydrophobic surface. Preferably, such materials will have a surface energy of greater than 46 dynes/$cm^2$ and/or may include hydrophilic groups, such as hydroxyl groups. An example of such a material is acetate rayon. Additionally, or alternatively, acceptable hydrophilic properties can be achieved by treating metal surfaces. Such treated metal surfaces include annealed austentic stainless steel, laser or plasma coated stainless steel or oxide or nitride modified surface coatings.

It will be appreciated that the ingress of catholyte liquid into the porous member may be unfavourable as this will block the throughflow of oxidant, meaning that the rate of oxidation of that catholyte will be reduced. To overcome this problem, the porous member may be formed of a material which is hydrophobic, with a coating on the surface exposed to the catholyte channel which is hydrophilic. Examples of hydrophobic materials from which the porous member may be formed include polytetrafluoroethylene, halogenated organic polymers, silicone polymers and hydrocarbon polymers such as polythene and polypropylene. Additionally, or alternatively, the maximum pore size can be sufficiently small such that the surface tension of the catholyte prevents it from entering the porous member even when no oxidant is passed through the porous member.

The pores in the porous member, especially its active surface, may be formed using any technique known to those skilled in the art. In preferred embodiments, the pores are produced by laser machining or electroforming.

The catholyte channel and porous member may be arranged in any way, provided that the redox couple in the catholyte solution is at least partially regenerated.

In one arrangement, the porous member may be an elongate member. In a preferred embodiment, the porous member is substantially cylindrical or tubular. One or more porous members may be employed in the fuel cell of the present invention.

Alternatively, the catholyte channel may be provided as a tube coiled around the porous member, as a channel co-axial with the porous member or as an annulus around the porous member. In such arrangements, the channel wall may be open along substantially all of its length or along parts of its length to expose the interior of the catholyte channel to parts of the active surface of the porous member. The oxidant is supplied to an interior of the porous member at a positive pressure, causing the oxidant to pass through the outer surface of the porous member and into the catholyte channel.

In an alternative arrangement, the catholyte channel may be formed within the porous member. The catholyte channel may be linear or may be helical. In these arrangements, the active surface of the porous member is provided on the interior surface of the porous member and oxidant is passed inwardly through the porous member, through the inner, active surface and into the catholyte channel.

In certain embodiments, most preferably those where the interior of the catholyte channel is exposed to the active surface of the porous member around the majority, if not the totality of its circumference, the regeneration zone of the fuel cell may preferably comprise catholyte rotation means, to maximise the exposure of the catholyte to the active surface, thus maximising oxidation of the redox couple. The rotation means could comprise an offset liquid inlet, to cause helical flow of the catholyte through the channel. Additionally, or alternatively, the rotation means may comprise a diversion member to induce rotational flow through the channel by means of, for example, spiral-like protuberances.

In a further arrangement, the regeneration zone may comprise generally planar porous members which define one or more walls of a chamber. An open end of the catholyte channel is provided to ensure that the stream of catholyte exiting the catholyte channel is directed toward and flows past at least a portion of the active surface of the porous member. This may be achieved by locating the open end of the catholyte channel substantially adjacent to the planar porous member or a slight distance away from, but pointed toward the porous member.

The flow rate of the catholyte through the regeneration zone is preferably relatively high. In a preferred embodiment, the flow rate of the catholyte, as it contacts or passes adjacent to the active surface of the porous member is at least about 0.2 m/s. In an especially preferred embodiment, the flow rate of the catholyte as it contacts or passes adjacent to the active surface of the porous member is about 0.5 to about 1.5 m/s.

The sparging of air into the liquid through the porous member (device) introduces bubbles in the catholyte and may form froth. The fine air (oxidant) bubbles provide an increased surface area that promotes transfer of oxygen and the desired oxidation of the liquid catalyst/mediator system.

The device may be advantageously employed in the regeneration system because smaller contact volume is required for a given amount of reaction, and so a smaller and more portable regenerator can be built.

Figure 3:
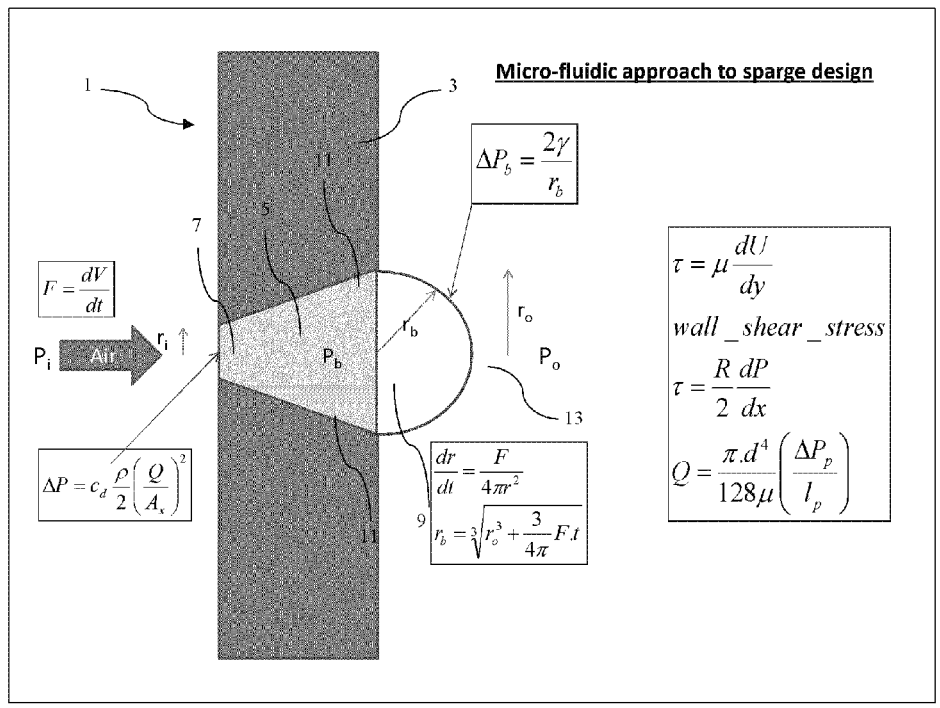
Figure 4:
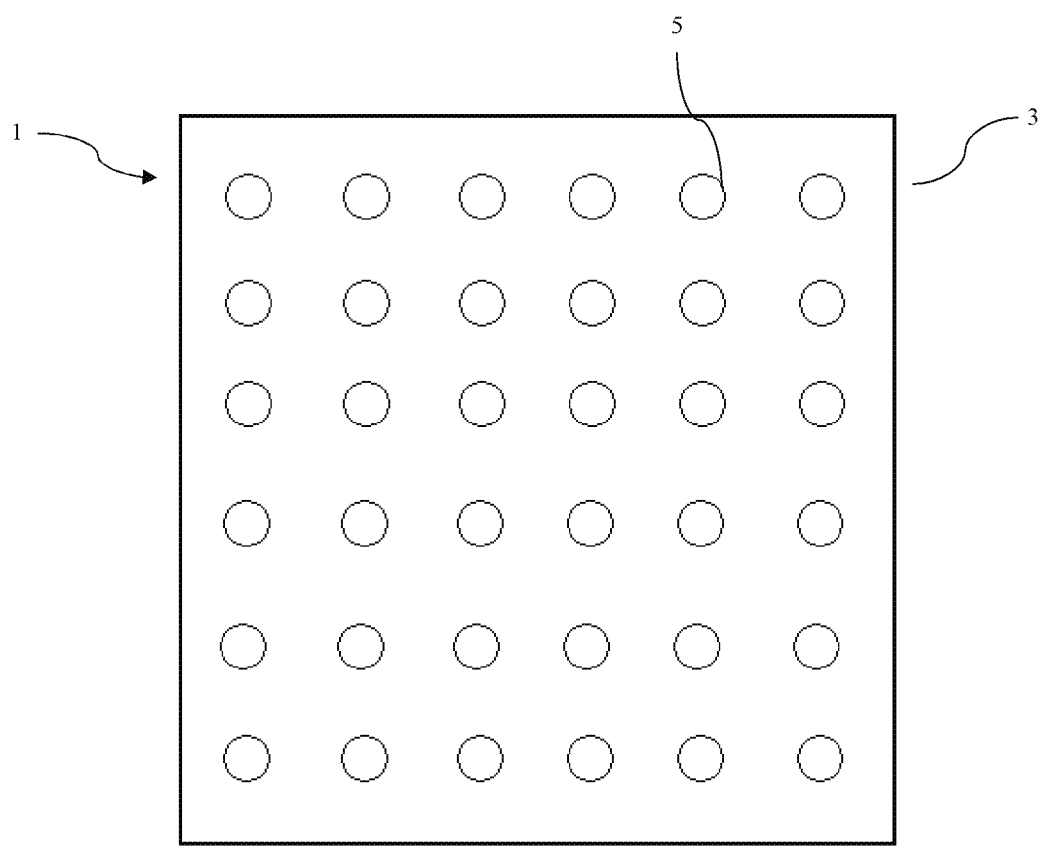
Figure 5:
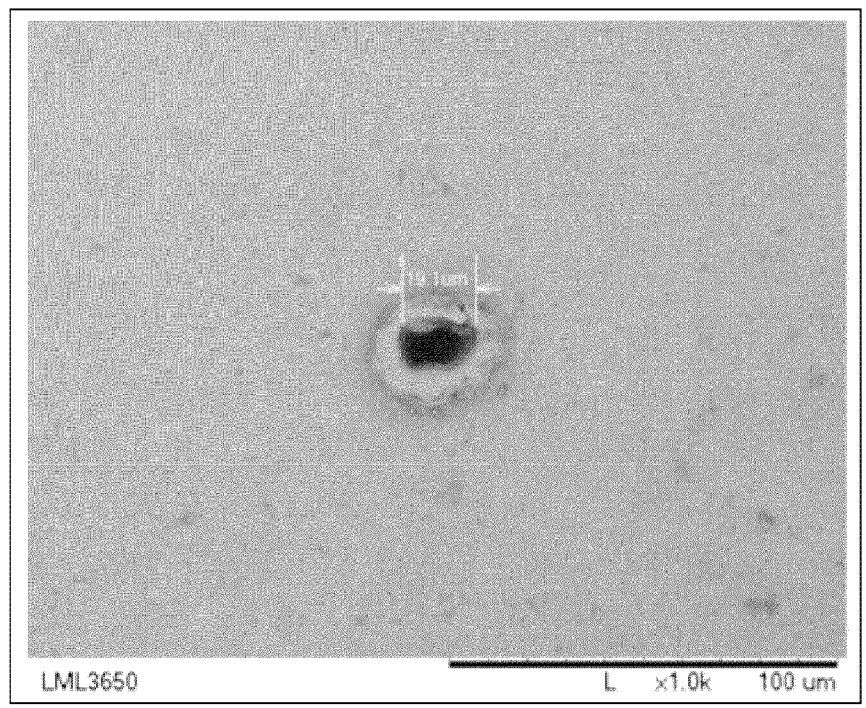
Figure 6:
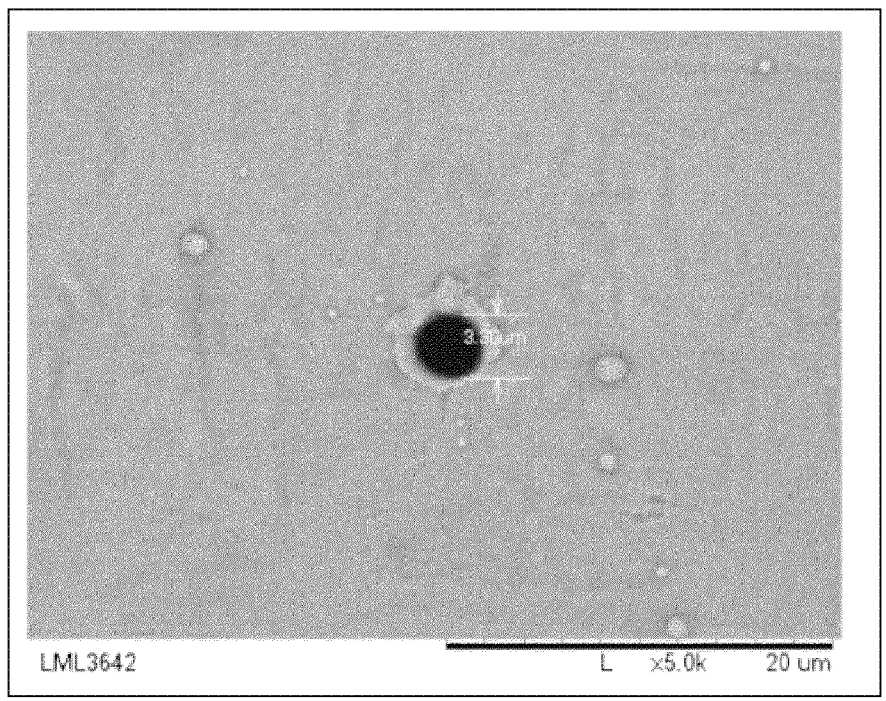
Figure 7:
Figure 8:
Figure 9:
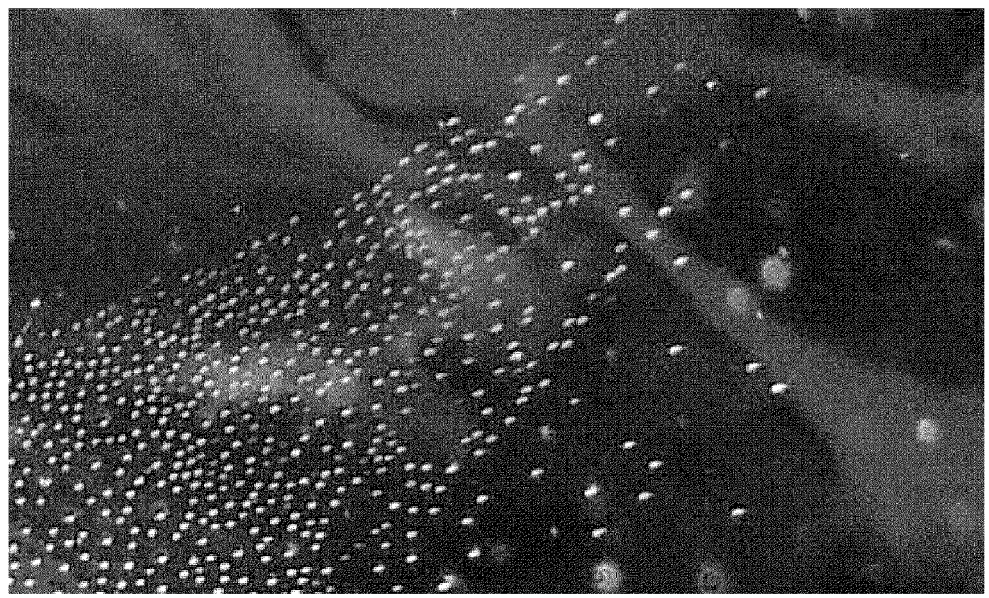
Figure 10:
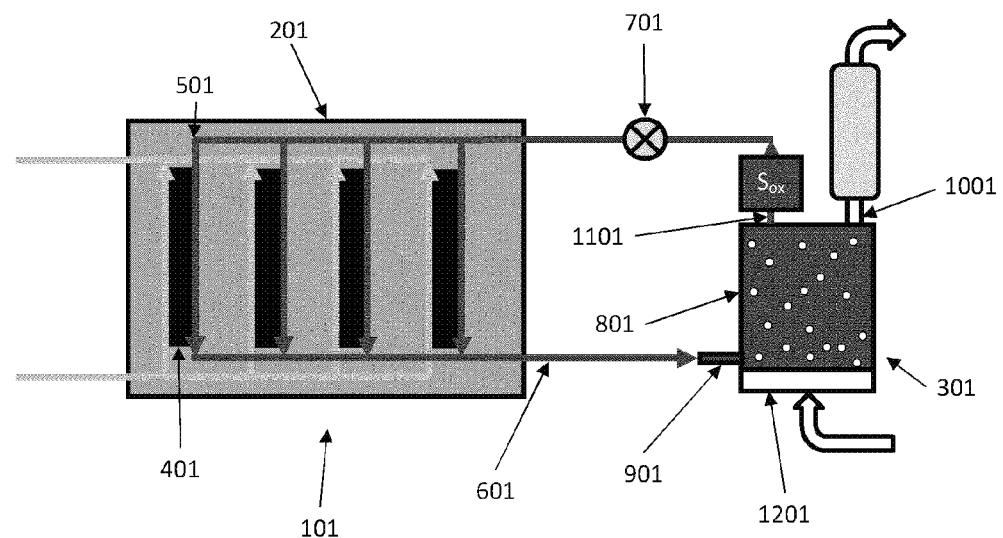

Various aspects of the present invention will now be more particularly described with reference to the following figures which illustrate embodiments of the present invention:

FIG. 1: is a schematic diagram of a gas bubble as it emerges from a traditionally-shaped hole (PRIOR ART);

FIG. 2: is a graph of bubble growth for a fixed feed flow (7 μl/s) and hole size of 30 μm diameter;

FIG. 3: is an embodiment of the present invention in the form of a schematic diagram (side view) and descriptive Formulae for bubble formation through a conical hole;

FIG. 4: is a plan view of a device formed in accordance with an embodiment of the present invention;

FIGS. 4a(i)-(ix): respectively show a series of partial cutaway views of a device formed in accordance with an embodiment of the present invention having various different shaped holes formed in the device;

FIG. 5: is a plan view of a hole formed in a substrate shown from the laser entry (gas outlet);

FIG. 6: is a plan view of a hole formed in a substrate shown from the laser exit (gas inlet);

FIG. 7: is a photograph of fine-bubble formation in static water;

FIG. 8: is a photograph of fine-bubble formation by induced liquid;

FIG. 9: is a photograph of bubble formation in Polyoxometalate using current invention;

FIGS. 9a(i) and (ii): respectively show cross-sectional views of a portion of a catholyte channel provided with an offset liquid inlet and a diversion member to induce rotational flow of the catholyte solution through the catholyte channel; and FIG. 10: illustrates a schematic view of a fuel cell in accordance with the present invention.

With reference to FIG. 3, there is shown a schematic diagram (side view) and descriptive Formulae for bubble formation through a conical hole. The inventors found that the use of an orifice to restrict flow by a hole made as a truncated cone would deliver the sought-after properties in accordance with the present invention. As the bubble expands beyond the break-through pressure, air supply would be limited by the restriction of the orifice, and so the flow term, F, in Formula (1) is reduced and the rate of growth is decelerated. A schematic representation of the break-through point is given in FIG. 3, together with the descriptive formulae for the flow rate through the orifice and the rate of bubble growth, in which:

F=flow rate of gas=rate of change of volume in the bubble=dV/dt
$r_i$=gas inlet hole radius
$r_b$=radius of bubble
$r_o$=gas outlet hole radius
$P_i$=Inlet pressure of gas
$P_b$=bubble internal pressure
$\Delta P$=orifice pressure drop
$\Delta P_b$=pressure drop across bubble=internal pressure-external pressure
$\Delta P_p$=liquid flow pressure drop
$I_p$=liquid flow characteristic dimension
R=pipe flow radius
d=pipe flow diameter
$c_d$=orifice discharge coefficient
t=time
dU/dy=liquid rate of strain=velocity profile
$A_x$=orifice cross sectional area
ρ=gas density
γ=interfacial tension
τ=viscous shear stress
μ=liquid viscosity
π=3.1415927

To embody this invention into a practical sparge plate (device) the above design formulae were used to calculate the size of entry and exit holed in the truncated cone and resulting flow rate of air. Typical values are shown in Table 2 below.

TABLE 2

| Number of Holes | Inner Radius [μm] | Outer Radius [μm] | Angle [°] | Flow rate [Liter/min] |
|---|---|---|---|---|
| 10000 | 2.5 | 25 | 18 | 0.5 |
| 10000 Test Example | 1 | 8 | 5 | 0.08 |
| 286 | 1.5 | 10 | 7 | 0.01 |

A test piece to prove the concept was made from 70 μm 316 stainless steel foil using a laser drilling technique. As part of the drilling technique a lip was formed on the laser entry side, gas outlet side of the hole, of 4 μm. The lip around the gas outlet side is of benefit as it lifts the bubble higher in the is laminar boundary layer of liquid flow, and increases shear stressed to detach the bubble from the solid substrate.

FIG. 3 illustrates a side view of a device for generating fine bubble, generally indicated (1), comprising an elongate substrate (3) having at least one hole (5) therethrough, the hole (5) comprising a gas inlet (7) and a gas outlet (9), wherein the width of the gas outlet (9) is greater than the width of the gas inlet (7).

The hole (5) is conical in structure and has inclined walls (11) extending from the gas inlet (7) to the gas outlet (9). The incline (taper of the hole), in this embodiment, is regular. In the schematic representation of FIG. 3, the walls (11) incline at an angle of 15° relative to the longitudinal axis of the hole (5)

As air passes through the hole (5), a bubble (13) is formed at the gas outlet (9) side of the hole (5).

With reference to FIG. 4, there is shown a plan view of the device (1) of FIG. 1. The device (1) comprises a substrate (3) formed from 316 stainless steel. The substrate (3) comprises 36 holes (5), each of 50 microns in size. This diagram is not to scale. The holes (5) are arranged in a 6×6 square pattern.

EXAMPLES

The practical embodiment of this invention was tested using a 10 mm by 10 mm section of laser drilled stainless steel plate mounted and sealed in an acrylic block with a regulated air supply. The entry and exit holes of the test piece were examined using SEM—see FIGS. 5 and 6. The gas entry (inlet) hole was measured at 3.3 μm and the gas exit (outlet) hole was measured at 19.1 μm.

The test plate was mounted horizontally. Air pressure of 250 mbar was applied to the feed of the test plate (small holes) and distilled water added to cover the surface. Bubble formation was observed and photographed. Bubbles accumulated and coalesced at the surface. Water flow across the holes was induced using a wash bottle of distilled water; again bubble formation was observed and photographed. Much finer bubbles were observed with the induced water flow.

These experiments were repeated using reduced polyoxometalate (0.3M solution).

From the photographs shown in FIGS. 7 and 8, using relative scaling, the bubbles under induced water flow were estimated to be of the order of 50 μm diameter. In FIG. 7, water bubbles are breaking at the surface and micro droplets of water can be seen above the surface of the water. In FIG. 8, surface bubbles of 1 mm can also be seen.

From the photograph shown in FIG. 9, the measurements with POM showed larger bubbles, of the order of 75 μm to 100 μm diameter. However, due to the opaque nature of POM only surface bubbles could be observed, and these were consistent with those in the water experiment.

Referring to FIG. 10, there is shown a fuel cell 101 in accordance with the invention. The cell comprises two major components: fuel cell stack 201 and regenerator section 301. Fuel stack 201 as illustrated comprises four ½ membrane electrode assemblies 401. Each membrane electrode assembly and cathode 401 is separated from its neighbouring membrane electrode assembly and cathode by a bipolar plate which, will comprise flow channels for allowing fuel (in the case of the anode side) to diffuse across the electrode surface in operation of the cell and a well to site the cathode electrode and catholyte (in the case of the cathode side), in a manner which is well known in the art. At each end of the fuel cell stack unipolar separating plates are provided (meaning that diffusion channels are provided on only one side thereof for the anode; the side facing the electrode, and a cathode well for the cathode). FIG. 10 does not attempt to show these plates, since their configuration, assembly and function are well known in the art.

Catholyte channels 601 are schematically shown in FIG. 10 and the arrows indicate the direction of fuel flow around the cell.

Catholyte is supplied to the fuel stack in line 501 through recycle pump 701 and is recovered, the redox mediator couple component of the catholyte having been at least partially reduced at the cathode in operation of the cell. The catholyte containing at least partially reduced redox mediator couple is recovered and supplied to regeneration chamber 801 through first inlet port 901. Regeneration chamber 801 is further supplied in second inlet port 1001 with a flow of oxidant; in this case air. The oxidant passes through a porous member 1201 into the interior of an adjacent channel (not shown) and contacts the at least partially reduced catholyte passing therethrough. The redox couple flowing in solution in the regeneration chamber in operation of the cell is used in the invention as a catalyst for the reduction of oxygen, in accordance with the following (wherein Sp is the redox couple species):

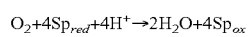

$$O_2 + 4Sp_{red} + 4H^+ \rightarrow 2H_2O + 4Sp_{ox}$$

Catholyte solution containing regenerated oxidised redox couple is recovered from regeneration chamber 801 through first outlet port 1101 and may be supplied directly into line 501 through recycle pump 701. Some or all of the water vapour may be condensed in condenser and returned to the catholyte solution, via a demister (not shown) in order to assist in maintaining the humidity balance in the cell.

In operation of the cell, electrons generated at the anode by the oxidation of fuel gas flow in an electrical circuit (not shown) and are returned to the cathode, in a manner well known.

The following Examples further illustrate the potential benefit of the fuel cell of the invention.

Example 1

A fuel cell system was prepared comprising thirty cells and a regenerator zone comprising eight parallel regenerator modules. Each module contained a 26 mm diameter tubular porous element with pore sizes around 50 microns.

The catholyte flow rate was 0.3 m/sec. After the catholyte passed the porous member, it flowed into an expansion zone which took the form of an open tube having an internal diameter of 32 mm and length of 200 mm. The system delivered a 1.5 kW electrical output.

The invention claimed is:
1. A radar fuel cell comprising:
an anode and a cathode separated by an ion selective polymer electrolyte membrane;
a fuel supply in communication with the anode region of the cell;
an oxidant supply in communication with the cathode region of the cell;
an electrical circuit between respective anodes and cathodes of the cell;
a catholyte solution comprising at least one catholyte component, the catholyte solution comprising a redox mediator couple; and
a regeneration zone comprising a catholyte channel and a porous member, the porous member having an oxidant receiving portion and a catholyte contact surface arranged to contact the catholyte solution;

the oxidant supply being adapted to supply the oxidant as a gas to the oxidant receiving portion of the porous member;

the porous member being configured to permit a flow of oxidant gas through the porous member from the oxidant receiving portion to the catholyte contact surface such that bubbles of oxidant gas can be generated in the catholyte solution at the catholyte contact surface;

wherein at least a portion of the catholyte contact surface is hydrophilic; and wherein further the catholyte channel is arranged to direct a flow of catholyte solution past at least a portion of the catholyte contact surface.

2. The fuel cell of claim 1, wherein at least a portion of the wall defining the catholyte channel is open to expose the interior of the catholyte channel to at least a portion of the catholyte contact surface of the porous member, said porous member comprises one or more of sintered glass, metal powders, porous membranes, meshes and drilled or punctured sheets.

3. The fuel cell of claim 1, wherein the average pore size in the catholyte contact surface of the porous member is 5 to 100 microns.

4. The fuel cell of claim 1, wherein the average pore size in the catholyte contact surface of the porous member is 20 to 50 microns.

5. The fuel cell of claim 1, wherein the catholyte contact surface is formed of or coated with a hydrophilic material.

6. The fuel cell of claim 1, wherein the porous member, except for the catholyte contact surface, is formed of a hydrophobic material.

7. The fuel cell of claim 1, wherein the porous member is an elongate member, a cylindrical and/or tubular, or generally planar.

8. The fuel cell of claim 1, wherein the porous member comprises a substrate having holes therethrough, each hole comprising a gas inlet and a gas outlet, wherein the width of the gas outlet is greater than the width of the gas inlet.

9. The fuel cell of claim 8, wherein the cross-sectional shape of each hole is one selected from circular, triangular, square, rectangular, pentagonal, hexagonal, heptagonal, octagonal, nonagonal and decagonal,
wherein the width of the gas outlet is an order of magnitude greater than the width of the gas inlet, and/or
wherein the hole tapers regularly from the gas inlet towards the gas outlet.

10. The fuel cell of claim 8, wherein the hole tapers irregularly from the gas inlet towards the gas outlet.

11. The fuel cell of claim 8, wherein the hole density on the substrate ranges from 400 to 10000 holes/cm$^2$.

12. The fuel cell of claim 8, wherein the substrate has a square pitch and the hole density on the substrate ranges from 1000 to 2500 holes/cm$^2$.

13. The fuel cell of claim 8, wherein the thickness of the substrate ranges from about 20 to 1000 microns.

14. The fuel cell of claim 8, wherein the thickness of the substrate ranges from about 50 to 100 microns.

15. The fuel cell of claim 8, wherein the gas inlet width ranges from about 0.1 to 0.2 gas outlet width.

16. The fuel cell of claim 8, wherein the average gas inlet width ranges from about 2 to 10 microns.

17. The fuel cell of claim 8, wherein the average gas outlet width ranges from about 5 to 100 microns.

18. The fuel cell of claim 8, wherein the average gas outlet width ranges from about 20 to 50 microns.

19. The fuel cell of claim 8, wherein the variation in the width of the gas outlet and/or gas inlet is no more than 10%.

20. The fuel cell of claim 8, wherein the gas outlet width is about half the width of the desired bubble size, wherein preferably the desired bubble size ranges from 50 to 100 microns.

21. The fuel cell of claim 8, wherein at least a portion of the catholyte contact surface of the substrate towards the gas outlets of the holes is hydrophilic and/or
wherein at least a portion of the catholyte contact surface of the substrate towards the gas outlets of the holes is formed of or coated with a hydrophilic material and/or
wherein at least a portion of the surface towards the gas inlet of the holes is formed of or coated with a hydrophobic material and/or
wherein at least a portion of the interior of the holes is coated with a hydrophobic material.

22. The fuel cell of any one of claim 8, wherein the gas outlet comprises a lip projecting away from the catholyte contact surface.

23. The fuel cell of claim 8, comprising stainless steel foil and/or polyimide film.

24. The fuel cell of claim 8, wherein the cross-sectional shape of each hole is circular, and the widths of the gas inlet and gas outlet are the diameters of the gas inlet and gas outlet.

25. The fuel cell of claim 24, wherein the angle of taper from the gas inlet towards the gas outlet is relative to the longitudinal axis of each hole and ranges from about 6° to 26°.

26. The fuel cell of claim 24, wherein each hole is a frustoconical shape.

27. The fuel cell of claim 1, wherein the catholyte channel is either provided as a tube adjacent to the exterior surface of the porous member, or formed within the porous member.

28. The fuel cell of claim 1, wherein the catholyte channel is provided with an offset liquid inlet into the catholyte channel, or a diversion member to induce rotational flow of the catholyte solution through the catholyte channel.

29. The fuel cell of claim 1, wherein the catholyte channel increases in cross section area in the direction of catholyte flow.

30. The fuel cell of claim 1, wherein the regeneration zone additionally comprises an expansion chamber in fluid communication with the catholyte channel.

31. The fuel cell of claim 1, wherein the regeneration zone additionally comprises a separation chamber in fluid communication with the catholyte channel.

32. The fuel cell of claim 31, wherein the separation chamber comprises a cyclone separator.

33. The fuel cell according to claim 1 wherein the regeneration zone comprises:
a chamber in which the regeneration reaction takes place;
a first inlet port for receiving into the chamber reduced redox mediator couple from the cathode region of the cell;
a first outlet port for supplying oxidised redox mediator couple to the cathode region of the cell; and/or
a second inlet port for receiving a supply of oxidant; and a second outlet port for venting gas, water vapour and/or heat from the chamber.

34. The fuel cell of claim 1, further comprising at least one demister provided in or upstream of the second outlet port of the regeneration zone.

35. The fuel cell of claim 34 further comprising a condenser provided in or upstream of the second outlet port of the regeneration zone for condensing water vapour and, optionally, returning the condensed vapour to the regeneration zone.

36. The fuel cell according to claim 1 wherein the catholyte solution further comprises a redox catalyst for assisting electron transfer between the oxidant and the at least partially reduced redox mediator couple.

37. The fuel cell according to claim 1 wherein the redox mediator couple and/or the redox catalyst when present comprises:
a polyoxometallate compound;
a polyoxometallate compound with a divalent counterion;
an N-donor compound;
a multi-dentate N-donor ligand comprising at least one heterocyclic substituent selected
from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid heterocyclic groups; a multidentate macrocyclic N-donor ligand; a modified ferrocene species; a modified ferrocene species comprising a bridging unit between the cyclopentadienyl rings; and/or a ligated transition metal complex.

38. A process for operating a redo fuel cell comprising:
providing an anode and a cathode separated by an ion selective polymer electrolyte membrane;
providing a catholyte solution comprising at least one catholyte component, the catholyte solution comprising a redox mediator couple;
providing a regeneration zone comprising a catholyte channel and a porous member, the porous member having an oxidant receiving portion and a catholyte contact surface arranged to contact the catholyte solution;
supplying on oxidant as a gas to the oxidant receiving portion of the porous member, the porous member being configured to permit a flow of oxidant gas through the porous member from the oxidant receiving portion to the catholyte contact surface to form bubbles of oxidant gas in the catholyte solution at the catholyte contact surface;
arranging the catholyte channel to direct directing a flow of catholyte solution past the catholyte contact surface, at least a portion of the catholyte contact surface being hydrophilic;
supplying a fuel to the anode region of the cell; and
providing an electrical circuit between respective anodes and cathodes of the cell.

39. The process according to claim 38, wherein the method results in combined generation of heat and power.

40. The process of claim 39, wherein the heat and/or power generated provides motive power to a vehicle or power to an electronic component.

41. The process according to claim 38, wherein the flow rate of catholyte solution through the catholyte channel is at least about 0.2 m/s; and/or wherein the flow rate of catholyte solution through the catholyte channel is at least about 0.5 to 1.5 m/s.

* * * * *